United States Patent [19]
Peterson

[11] Patent Number: 5,121,713
[45] Date of Patent: Jun. 16, 1992

[54] ECOLOGICAL ECONOMIZER

[76] Inventor: Elmo M. Peterson, 807 S. Lelia, P.O. Box 21, Guymon, Okla. 73942

[21] Appl. No.: 800,217

[22] Filed: Nov. 29, 1991

[51] Int. Cl.$^5$ ............................................. F02B 47/02
[52] U.S. Cl. ................................ 123/25 B; 123/25 A; 165/41
[58] Field of Search ............ 123/25 B, 25 D, 196 AB; 165/41, 51

[56] References Cited

U.S. PATENT DOCUMENTS

| | | | |
|---|---|---|---|
| 3,141,447 | 7/1964 | Jeruigan | 123/25 B |
| 3,761,019 | 9/1973 | Delic | 123/25 B |
| 4,046,119 | 9/1977 | Perry | 123/25 B |
| 4,376,739 | 3/1983 | Passey, Jr. | 123/25 B |
| 4,448,170 | 5/1984 | O'Hara | 123/25 B |
| 4,557,222 | 12/1985 | Nelson | 123/25 B |
| 4,632,067 | 12/1986 | Carlson | 123/25 B |
| 4,893,670 | 1/1990 | Jishi et al. | 123/196 AB |
| 4,898,261 | 2/1990 | Winberg et al. | 123/196 AB |
| 4,991,395 | 2/1991 | Markou et al. | 123/25 B |

FOREIGN PATENT DOCUMENTS 2084658  4/1982  United Kingdom ............... 123/25 P

*Primary Examiner*—E. Rollins Cross
*Assistant Examiner*—Erick Solis
*Attorney, Agent, or Firm*—Norman B. Rainer

[57] ABSTRACT

Apparatus is provided for use in association with an internal combustion engine to generate heated moist air which is directed into the intake manifold or carburetor of the engine. The apparatus employs a water-holding vessel equipped with coils for the circulation of hot lubricant and coolant fluids from the engine. Air is sucked into the vessel by virtue of the vacuum of the intake manifold. The air is then broken into a bubbled stream by passage through an apertured horizontally disposed sparger tube.

4 Claims, 2 Drawing Sheets

ECOLOGICAL ECONOMIZER

BACKGROUND OF THE INVENTION

1. Field of the Invention

This invention relates to internal combustion engines, and more particularly concerns apparatus which utilizes combustion-generated heat to improve fuel efficiency and secure additional advantages.

2. Description of the Prior Art

Numerous engine economizer systems have been disclosed in the prior art. Various methods have been employed in attempts to increase fuel economy, promote more efficient combustion, and utilize the heat generated as a by-product of combustion. Eriksen U.S. Pat. No. 2,746,440 discloses a carburetion apparatus adapted to exchange heat from engine exhaust gases with the liquid gasoline. The gasoline is heated to vaporize a gaseous fuel supply which is substituted for the normal atomized fuel/air mixture. Similarly, Dwyre U.S. Pat. No. 3,713,429 discloses a system whereby gasoline is heated by either exhaust gasses or coolant fluid from the engine. Simultaneously, air is injected into the heated fuel to initiate the atomization prior to the fuel reaching the carburetor.

Fuel additives have been disclosed for improving engine efficiency. For example, in U.S. Pat. No. 4,068,639 to Cook discloses the blending of liquid propane with gasoline and air in the carburetor, and utilizes exhaust back pressure to control the fuel mixture and flow.

Many systems have been disclosed which recirculate exhaust gases in a fuel/air mixture which is returned to the intake manifold of an engine, thereby heating the mixture to enhance combustion and reduce hydrocarbon emissions. The valve disclosed in U.S. Pat. No. 3,990,418 to Nohira and Tanaka is utilized in a system of this nature in order to prevent carburetor icing, a common occurrence due to the rapid cooling of water vapor contained in the exhaust gases.

Another method of providing greater engine economy has been the introduction of water vapor into the fuel/air mixture. Loby U.S. Pat. No. 3,908,613 utilizes special water mist injection nozzles to add a precisely metered mist of water vapor into each cylinder. The water vapor has several beneficial effects. It inhibits detonation, whereby a greater compression of fuel/air/water mixture may be achieved. The harmful mechanical degradation created by detonation within the cylinders under compression depletes power and reduces engine life. The water vapor also improves the electrical conductivity of the fuel/air mixture, thereby enhancing complete ignition of the mixture. The added water vapor further serves to accelerate expansion of gases in the cylinder during the power stroke, and reduces the operating temperature of the cylinder head. A leaner mixture of fuel may be used because the fuel mixture is often maintained richer than optimum for combustion purposes in order to prevent undesirable temperature rises in the cylinder heads. The Loby patent however, discloses a radically improved engine design which precludes the use of such water vapor induction in standard internal combustion engines.

The prior art discloses means for utilizing both exhaust gases and radiator coolant fluid as means for heating fuel. Although the engine heat is being utilized, the engine oil is still circulating in the engine at elevated temperatures. At higher temperature, motor oil is susceptible to breakdown in viscosity, and thereby has diminished friction-reducing capability. The higher temperatures also promote rapid degradation of the oil, thereby reducing its useful life.

It is therefore an object of the present invention to provide an engine economizer system which will reduce the fuel consumption of an internal combustion engine per unit of work achieved.

It is another object of the present invention to provide a system of the aforesaid nature which will significantly reduce the level of hydrocarbon and carbon monoxide emissions from an internal combustion engine.

It is a further object of this invention to provide a system of the aforesaid nature which will increase the useful life of an internal combustion engine, its spark plugs, valves, motor oil, and exhaust system.

It is yet another object of the present invention to provide a system of the aforesaid nature which is adaptable to a variety of commercially available engines.

It is still another object of this invention to provide a system of the aforesaid nature which is easy to install and maintain, has a minimal number of moving parts, is durable, and amenable to low cost manufacture.

SUMMARY OF THE INVENTION

The above and other beneficial objects and advantages are accomplished in accordance with the present invention by an engine economizer system adapted to supply an internal combustion engine with a heated air and water vapor mixture, said engine having a carburetor, intake manifold, lubricating system adapted to circulate lubricant throughout said engine, and cooling system adapted to circulate coolant fluid throughout said engine, said economizer system comprised of:

a) a containment vessel having an interior region adapted to contain water and bounded in part by top and bottom panels, said vessel having:
1) water level control means having water level detection means and water inlet valve, said control means adapted to maintain a constant level of water within said containment vessel, defined by a water surface,
2) an engine coolant fluid circuit comprised of rigid tubing having coils disposed beneath said water surface and having inlet and outlet extremities emergent from said containment vessel, said inlet extremity adapted to receive heated engine coolant fluid form said engine cooling system, said outlet extremity adapted to return said coolant fluid to said cooling system,
3) an engine lubricant circuit comprised of rigid tubing having coils disposed beneath said water surface, and having inlet and outlet extremities emergent from said containment vessel, said inlet extremity adapted to receive lubricant from said engine lubricating system, said outlet extremity adapted to return said lubricant to said lubricating system,
4) an elongated air passage vertically disposed and having an upper extremity emergent from said top panel and a lower extremity disposed beneath said water surface, and
5) air disbursement means horizontally disposed beneath said water surface and having a proximal extremity communicating with said lower extremity, said disbursement means having a plurality of air escape orifices.

b) a water reservoir adapted to supply water by way of said water level control valve, thereby maintaining a constant level of water within said vessel, c) air filter means associated with said upper extremity of said air passage and adapted to filter air drawn into said containment vessel, d) a vacuum aspiration port penetrating said top panel and adapted to permit emergence of heated air and water vapor mixture from said vessel, and e) engine induction means associated with one of said carburetor and intake manifold and adapted to draw in said heated air and water vapor mixture by means of a hose connection to said aspiration port.

In a preferred embodiment, the containment vessel may be constructed from a cylindrical steel tank. The tank may be equipped with stabilizing feet, a drain plug, and a lifting ring. The tank may have a sight glass penetrating the sidewall in order to monitor the water level within. The tank may have insulating material associated with all outer surfaces.

In some embodiments, the water level control means may be in the form of a float mechanism comprising a float, control linkage, and valve. In alternative embodiments, the control means may be in the form of an electronic contact sensor-relay means and electric pump.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
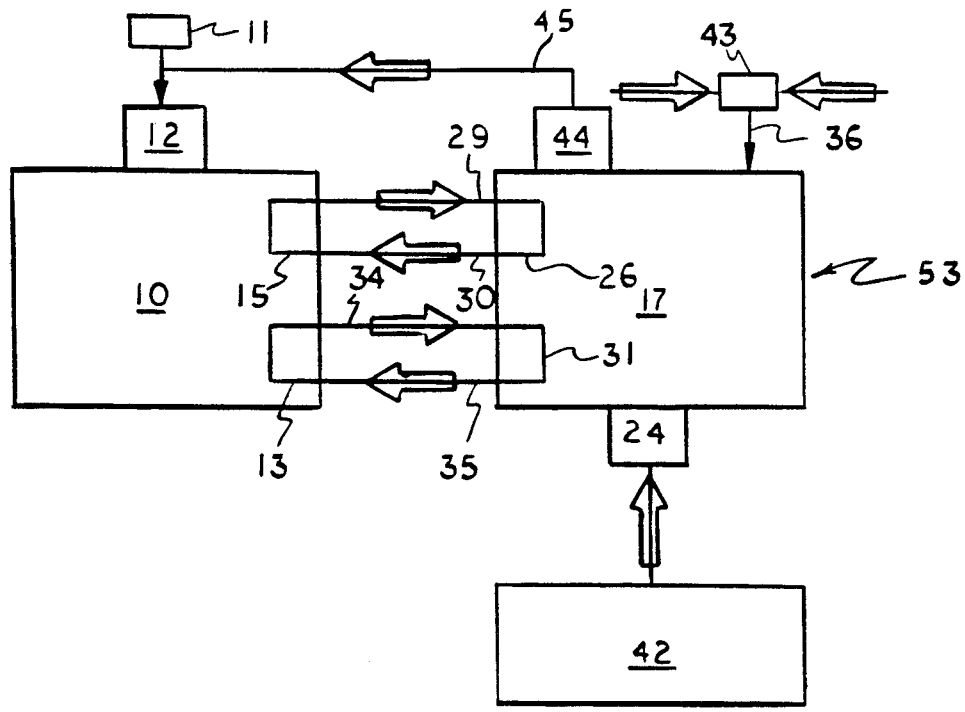
FIG. 1 is a schematic view of an embodiment of the engine economizer system of the present invention.
Figure 3:
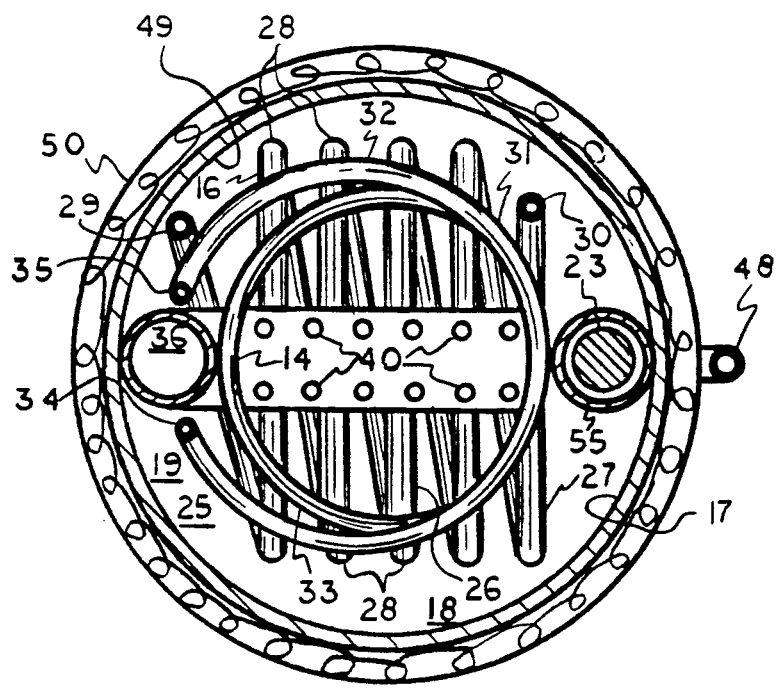
FIG. 3 is a horizontal section view taken upon the 3—3 line of FIG. 2.
Figure 2:
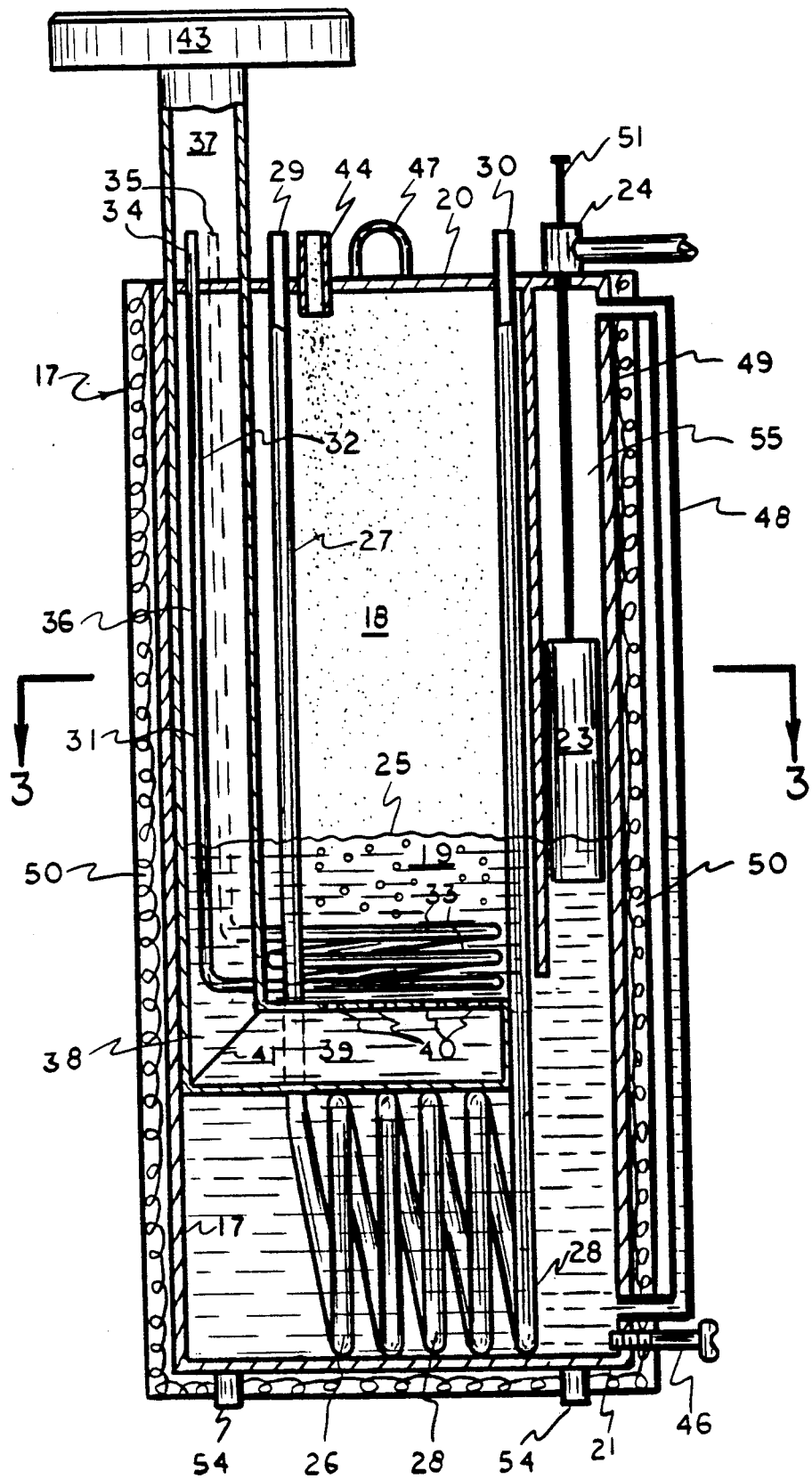
FIG. 2 is a vertical sectional view of a containment vessel useful in the embodiment of FIG. 1.

Referring to FIGS. 1-3, an embodiment 53 of the engine economizer system of the present invention is shown in operative association with an engine 10 having a carburetor 11, intake manifold 12, lubricating system 13 adapted to circulate lubricant throughout engine 10, and cooling system 15 adapted to circulate coolant fluid throughout engine 10.

The economizer system is comprised of a containment vessel in the form of steel tank 17 having interior region 18 adapted to contain water 19 and bounded by top and bottom panels 20 and 21, respectively, and cylindrical sidewall 49. Said tank has water level control means comprised of water level detection means in the form of float 23 disposed within guide channel 55 and connected by way of linkage rod 51 to water inlet valve 24. Said water level control means maintains a constant level of water 19 within containment tank 17, defined by water surface 25.

Engine coolant fluid circuit 26 is comprised of rigid tubing 27 having coils 28 disposed beneath water surface 25. Inlet and outlet extremities 29 and 30, respectively, emerge from top panel 20. Inlet extremity 29 is adapted to receive heated engine coolant fluid via a conventional hose from engine cooling system 15. Outlet extremity 30 is adapted to return coolant fluid via a conventional hose to cooling system 15.

Engine lubricant circuit 31 is comprised of rigid tubing 32 having coils 33 disposed beneath water surface 25. Inlet and outlet extremities 34 and 35, respectively, emerge from top panel 20. Inlet extremity 34 is adapted to receive lubricant via a conventional hose form engine lubricating system 13. Outlet extremity 35 is adapted to return lubricant via a conventional hose to lubricating system 13.

Elongated air passage 36 is vertically disposed within tank 17 and has upper extremity 37 emergent from top panel 20 and lower extremity 38 disposed beneath water surface 25. Air disbursement or sparger means 39, having air escape orifices 40, is horizontally disposed beneath water surface 25 and has proximal extremity 41 communicating with lower extremity 38.

Water reservoir 42 is adapted to supply water by way of water level control valve 24, thereby maintaining a constant level of water within tank 17. Air filter means 43 is associated with upper extremity 37 of said air passage and is adapted to filter air drawn into said containment tank. Vacuum aspiration port 44 penetrates top panel 20 and is adapted to permit emergence of heated air and water vapor mixture from tank 17.

Hose 45 conveys the heated air and water vapor mixture from aspiration port 44 to intake manifold 12.

Containment tank 17 is further equipped with stabilizing feet 54, drain plug 46 which penetrates sidewall 49, and lifting ring 47 attached to top panel 20. A sight glass 48 penetrates the sidewall 49 in order to permit visual monitoring of the height of water surface 25. Insulating material 50 is associated with all outer surfaces of said tank.

As air is drawn into intake manifold 12 from aspiration port 44, a vacuum is created above water level 25, causing fresh air to be drawn through air passage 36 and filter 43. The air enters disbursement means 39 through proximal extremity 41 and bubbles upward form orifices 40. Water 19 contained in tank 17 is heated by the passage of hot coolant fluid and lubricant through circuits 31 and 26, respectively. Air bubbling through the heated water 19 generates an air-water vapor mixture which is aspirated through port 44 and drawn into engine 10 through induction hose 45.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An engine economizer system adapted to supply an internal combustion engine with a heated air and water vapor mixture, said engine having a carburetor, intake manifold, lubricating system adapted to circulate lubricant throughout said engine, and cooling system adapted to circulate coolant fluid throughout said engine, said economizer system comprised of:

a) a containment vessel having an interior region adapted to contain water and bounded in part by top and bottom panels, said vessel having:

1) water level control means adapted to maintain a constant level of water within said containment vessel, defined by a water surface, 2) an engine coolant fluid circuit comprised of rigid tubing having coils disposed beneath said water surface and having inlet and outlet extremities emergent from said containment vessel, said inlet extremity adapted to receive heated engine coolant fluid from said engine cooling system, said outlet extremity adapted to return said coolant fluid to said cooling system, 3) an engine lubricant circuit comprised of rigid tubing having coils disposed beneath said water surface, and having inlet and outlet extremities emergent from said containment vessel, said inlet extremity adapted to receive lubricant from said engine lubricating system, said outlet extremity adapted to return said lubricant to said lubricating system, 4) an elongated air passage having an upper extremity emergent from said top panel and a lower extremity disposed beneath said water surface, and 5) air disbursement means horizontally disposed beneath said water surface and communicating with said lower extremity, said disbursement means having a plurality of air escape orifices, b) a water reservoir adapted to supply water by way of said water level control means, c) air filter means associated with the upper extremity of said air passage and adapted to filter air drawn into said containment vessel, d) a vacuum aspiration port penetrating said top panel and adapted to permit emergence of heated air and water vapor mixture from said vessel, and e) engine induction means associated with one of said carburetor and intake manifold and adapted to draw in said heated air and water vapor mixture by means of a hose connection to said aspiration port.

2. The engine economizer system of claim 1 wherein said containment vessel is further equipped with stabilizing feet, a drain plug adjacent said bottom panel, and a lifting ring attached to said top panel.

3. The engine economizer system of claim 1 wherein said containment vessel is further equipped with a sight glass which permits visual observation of the level of water in said vessel.

4. The engine economizer system of claim 1 wherein said containment vessel has thermal insulating material disposed upon its outer surface.

* * * * *